United States Patent [19]
Bollinger

[11] 3,733,051
[45] May 15, 1973

[54] TRAILER JACK

[76] Inventor: Robert A. Bollinger, 410 West 21st Street, Lumberton, N.C. 28358

[22] Filed: Apr. 30, 1971

[21] Appl. No.: 138,898

[52] U.S. Cl. ................................................254/94
[51] Int. Cl. .............................................B66f 7/22
[58] Field of Search ..........................254/94, 86 R; 280/150.5

[56] References Cited

UNITED STATES PATENTS

| 1,091,390 | 3/1914 | Riopel | 254/86 R |
| 2,132,903 | 10/1938 | MacMurray | 254/94 |
| 3,614,064 | 10/1971 | Bennett | 254/86 R |
| 3,093,362 | 6/1963 | Schaefer | 254/86 R |
| 1,791,396 | 2/1931 | Ahola et al. | 254/86 R |
| 1,807,802 | 6/1931 | Stevens | 254/94 |

Primary Examiner—Othell M. Simpson
Attorney—Clarence A. O'Brien and Harvey B. Jacobson

[57] ABSTRACT

A trailer jack comprising a two-part axle engaging collar adapted for slidable positioning on the axle and a lifting shaft pivoted between a pair of mounting plates affixed to the collar. The shaft, in its retracted position, is retained by a retaining pin engaged through the shaft and opposed holes within the mounting plates. Upon a release of the retaining pin, the jack pivots downward into engagement with the ground at an angular relation thereto with movement of the vehicle causing an upward riding of the engaged vehicle axle onto the shaft. The shaft engages the collar upon arrival at a vertical position with the axle elevated.

2 Claims, 7 Drawing Figures

PATENTED MAY 15 1973   3,733,051

Robert A. Bollinger
INVENTOR

BY Clarence A. O'Brien
and Harvey B. Jackson
Attorneys

PATENTED MAY 15 1973 3,733,051

Robert A. Bollinger
INVENTOR.

BY Clarence A. O'Brien
and Harvey B. Jacobson
Attorneys

TRAILER JACK

The present invention generally relates to jacks of the type whereby the elevation of the vehicle is effected by a forward movement of the vehicle itself so as to produce an upward swinging of the vehicle engaged end of the lifting shaft and a corresponding elevation of the vehicle. More particularly, the invention herein is concerned with a jack of this type which is adapted for use in conjunction with low axle trailers and the like.

Among the significant objects of the invention are the provision of a jack which is of a relatively simple although highly unique construction incorporating a minimum of moving parts, the provision of a jack which mounts on the wheel axle and is easily adjusted therealong so as to accommodate itself to the elevation of either side or even the central portion of the axle, and hence the trailer, in a manner so as to avoid the necessity of providing separate jacks associated with each wheel end of the axle, and the provision of a jack whereby the lifting heighth thereof can be simply adjusted. Provision is also made for securely retaining the jack in either its upwardly swung stored position or its downwardly extending load supporting position.

Other objects of the invention include the provision of a jack which can be easily mounted on any conventional trailer or the like, is easily used, and is of an economically feasible and structurally superior construction.

Basically, the objects of the instant invention are achieved through the provision of a jack which incorporates a two-part axle receiving collar, the upper part of the collar incorporating a pair of laterally projecting spaced plates which pivotally mount the lifting shaft therebetween. The lifting shaft includes a series of mounting apertures whereby an adjustment in the effective lifting height thereof can be easily effected. The mounting plates also include a pair of opposed openings which selectively align with one of the shaft openings upon an upward swinging of the shaft for the reception of an elongated retaining pin therethrough for an effective retention of the lifting shaft in its upwardly swung stored position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5:
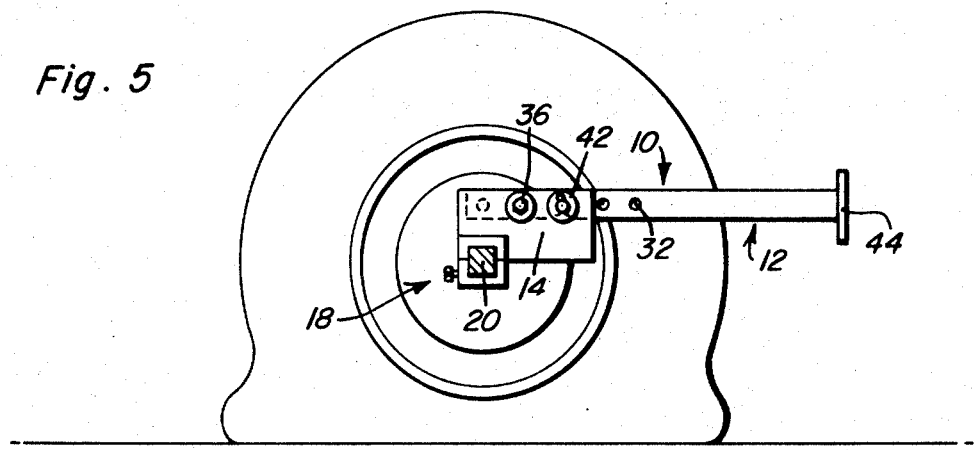
Figure 6:
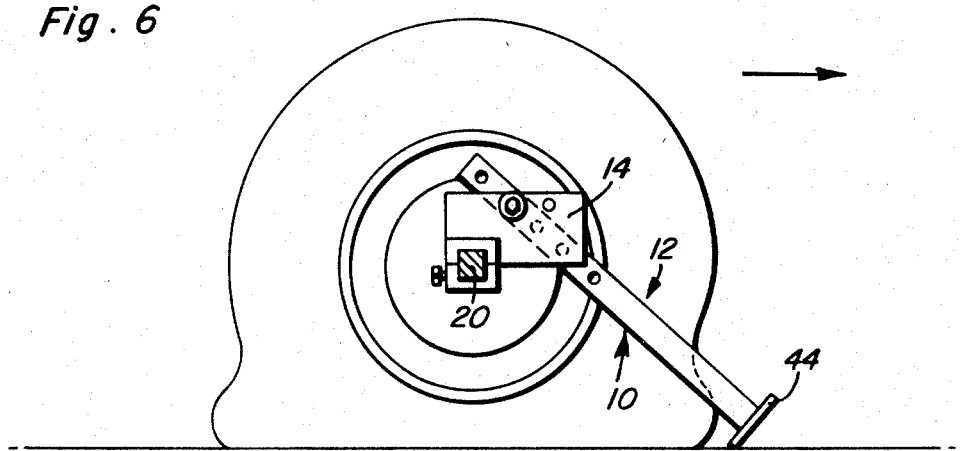
Figure 7:
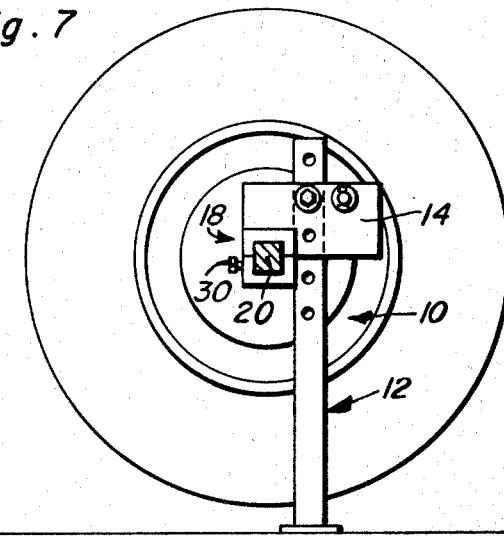

FIGS. 5, 6 and 7 sequentially illustrate the use of the jack from the initial stored position thereof to the final vehicle raising position thereof.

Referring now more specifically to the drawings, reference numeral 10 is used to generally designate the jack comprising the instant invention. The jack 10 basically includes a single moving part, the elongated lifting shaft 12 which is pivotally received between a pair of laterally spaced vertically orientated mounting or support plates 14. The plates 14 are in turn welded to the upper part 16 of a two-part axle collar 18.

The collar 18 is normally of a rectangular cross-section so as to conform to and encompass the normally rectangular axle 20 of a conventional boat trailer 22 or the like. The lower part of the mounting collar 18, designated by reference numeral 24, is of a U-shaped configuration while the upper collar part 16 is of a similar although inverted configuration so as to combine with the lower part 24 in forming the desired axle encompassing construction. The upper and lower collar sections or parts 16 and 24 are releasably interlocked about a trailer axle 20 by means of four headed bolts 26 engaged vertically through the aligned four corner sections of the collar parts 16 and 24, each of bolts 26 receiving a threaded nut 28 thereon for a clamping of the parts 16 and 24 together.

It will be noted that the two-part collar 18 is relatively long so as to provide a substantial degree of stability to the jack 10. Further, with reference to FIG. 3, the lower collar part 24 incorporates an internally threaded bore 28 therethrough which receives a lock-screw or bolt 30 selectively inwardly extensible so as to effect a positive non-slipping or rattling movement of the collar 18 to the trailer axle 20. This lock-screw 30 is of particular significance in accommodating the collar 18 to axles 20 of varying sizes within a particular range generally limited by the size of the collar parts 16 and 24.

Figure 3:
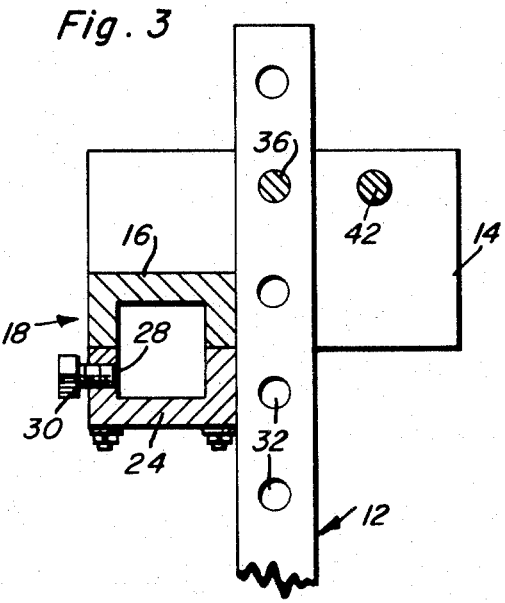
FIG. 3 is an enlarged vertical cross-sectional view through the upper portion of the jack.
Figure 4:
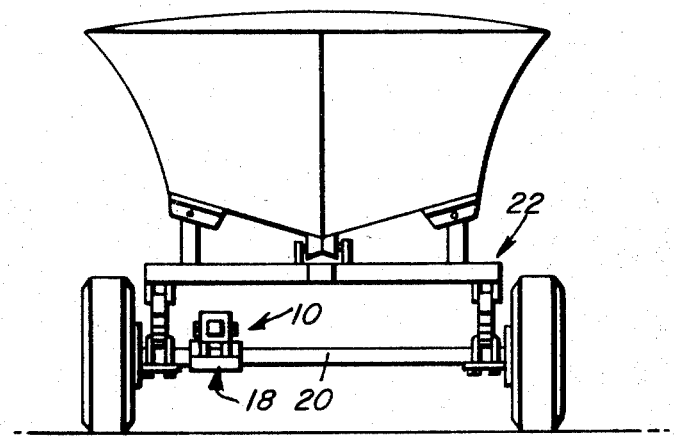
FIG. 4 is a front view of the trailer with the jack mounted thereon.

The support plates 14 are welded to the central portion of the upper collar part 16 and project laterally therefrom for the accommodation of the lifting shaft 12 therebetween to one side of the collar 18. The lifting shaft 12 includes a series of bores or holes 32 transversely therethrough. These holes 32 are selectively alignable between a pair of opposed plate holes or passages 34 for the reception of a pivot pin or bolt 36 therethrough. The plate holes 34 and pivot pin 36 are so located and so mount the lifting shaft 12 as to enable a swinging of the lifting shaft 12 between a vertical load supporting position engaged directly against the forward vertical face of the collar 18, as illustrated in FIGS. 3 and 7, and a horizontal stored position overlying the collar and projecting forwardly therefrom, as illustrated in FIG. 5.

Figure 1:
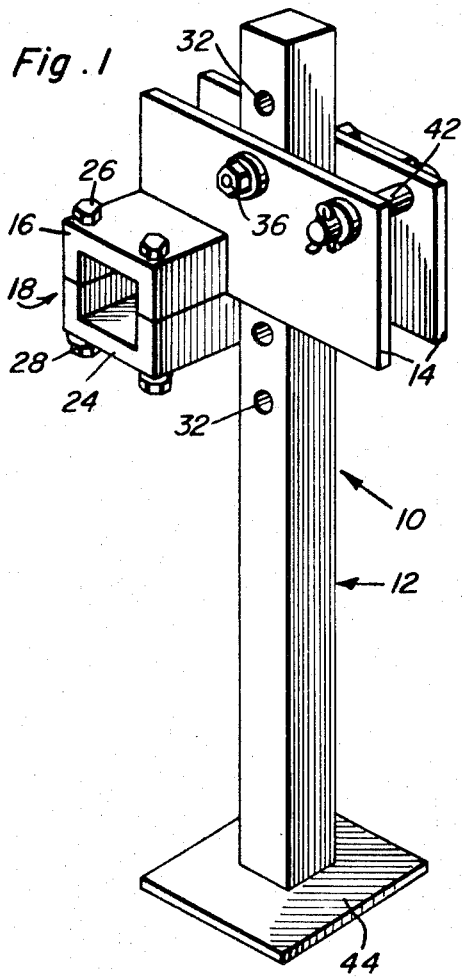
FIG. 1 is a perspective view of the trailer jack of the instant invention.
Figure 2:
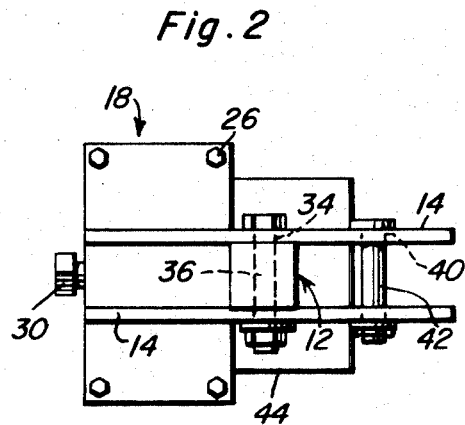
FIG. 2 is a top plan view of the jack.

The plurality of a pivot pin receiving holes 32 in the lifting shaft 12 enable an adjustment in the vertical lifting height of the jack 10 for an accommodation of the jack to different height trailer axles 20. By the same token, the provision of at least one hole 32 below the hole receiving the pivot pin 36 is significant as constituting a portion of the means utilized to retain the lifting shaft 12 in its raised or stored position as in FIG. 5. In effecting this, the supporting or mounting plates 14 are provided with a second pair of transversely aligned holes or passages 40 generally horizontally aligned with and located forward of the first plate holes 34 sufficient so as to align with one of the shaft holes 32 upon an upward swinging of the shaft 12. Upon an alignment of the shaft hole 32 with the forwardly located plate holes 40, a retaining pin 42 is introduced therethrough for a releasable locking of the lifting shaft 12 in a forwardly projecting elevated position so as to enable a completely unencumbered traveling of the trailer 22. Incidentally, while the pivot pin 36 will be of a relatively permanent installation once the lifting shaft 12 is adjusted for any particular trailer 22, the retaining pin 42 should be mounted in a manner which allows for its easy manual release when the use of the jack 10 is required. One manner of simply effecting this would be through the use of a cotter pin as suggested in FIG. 1.

With reference to FIGS. 5, 6 and 7, it is believed that the use of the jack will be readily apparent. In FIG. 5, the jack is in its elevated stored position. When a raising of the trailer is desired, the retaining pin 42 is removed and the lifting shaft allowed to pivot downwardly until the rigid and large rectangular plate-like foot 44 engages the ground. The relatively sharp edge of the foot 44 will tend to bite into the ground and stabilize the lifting shaft as the trailer is moved forwardly. The forward movement of the trailer causes a gradual elevation of the axle as the lifting shaft moves to a vertical position. Once the lifting shaft 12 has been swung to a completely vertical position, it engages against the axle mounted collar 18, functioning so as to stabilize the jack and elevated trailer and preclude a continued forward movement of the trailer. In this position, the trailer is stabilized for a changing of the tire or such other work as is required. It will, of course, be appreciated that the trailer towing vehicle will normally be braked so as to preclude a rearward rolling of the trailer, or as an alternative, the trailer itself can be blocked against rolling movement off the jack. Likewise, if deemed desirable, the shaft 12 can be pinned between the plates 14 slightly forward of the illustrated position, whereby a slight over center movement of the shaft 12 will be effected prior to engagement against the axle surrounding collar 18. Such an orientation would result in a self-stabilizing construction whereby any tendency for the trailer to roll backward off the shaft 12 would be precluded. Once the necessary repairs have been made, it will be appreciated that a lowering of the trailer will be easily effected by physically moving the trailer rearward for a downward swinging thereof until such time as the trailer is supported on the wheels thereof and the lifting shaft 12 free to be manually swung upward into its stored position.

One additional feature of particular significance with regard to the jack of the instant invention is that the axle surrounding nature of the collar 18 is such so as to enable a sliding of the jack to any point along the trailer axle 20, thus avoiding the necessity of providing separate jacks for each wheel.

From the foregoing, it will be appreciated that a highly unique jack construction has been defined. The jack is of a relatively simple construction consisting basically of a lift shaft pivoted directly to and between a pair of projecting support plates affixed to an axle mountable collar. No elaborate linkage or mechanically interacting parts are required or utilized. This same basic simplicity is likewise incorporated in the unique manner provided for locking the lifting shaft in its stored position, such being effected through the use of a single retaining pin engaged through a shaft hole upon a positioning of the shaft hole between a pair of aligned holes in the support plates which pivotally mount the shaft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may resorted to, falling within the scope of the invention.

What is claimed as new is as follows:

1. A jack for trailers or the like comprising an axle engaging collar, a lifting shaft, shaft mounting means affixed to said collar, said shaft mounting means comprising shaft supporting plate means, a pivot pin pivotally securing said shaft to said plate means for movement between a substantially vertical depending load supporting position and a retracted stored position, said pivot pin being located in spaced relation above and to one side of said collar, said shaft in the load supporting position, engaging against said one side of the collar, said collar acting as a limit to the pivoting of the shaft, means for adjusting the point of pivotal engagement between the shaft and the plate means comprising pivot pin receiving hole means through the plate means and a series of pivot pin receiving holes through the shaft along the length thereof selectively alignable with the pivot pin receiving hole means in the plate means, said plate means comprising a pair of laterally spaced parallel plates affixed to and projecting transversely from said collar, said lifting shaft being received between said plates, and a shaft retainer engaged directly between said shaft and said plate means when said shaft is in the retracted position to retain said shaft in said retracted position.

2. The jack of claim 1 wherein said collar is formed of upper and lower releasably interconnected parts, said collar parts being engageable about an axle in a manner so as to enable a slidable positioning of the collar and jack along the axle for orientation as desired, said air of laterally spaced parallel plates being fixed to the upper collar part in a manner so as to project vertically thereabove.

* * * * *